(12) United States Patent
Hardy et al.

(10) Patent No.: US 11,388,239 B2
(45) Date of Patent: Jul. 12, 2022

(54) PREVIEWING IMPACTED ENTITIES IN AUTOMATED DEVICE DEFINITIONS

(71) Applicant: VMware, Inc., Palo Alto, CA (US)

(72) Inventors: Adam Michael Hardy, Alpharetta, GA (US); Qi Gao, Palo Alto, CA (US); Jason Bedient, Palo Alto, CA (US); Binjie Sun, Atlanta, GA (US); Carlos Carbonell, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 331 days.

(21) Appl. No.: 16/435,624

(22) Filed: Jun. 10, 2019

(65) Prior Publication Data
US 2020/0389525 A1 Dec. 10, 2020

(51) Int. Cl.
*H04L 67/125* (2022.01)
*H04L 9/40* (2022.01)
*H04L 67/303* (2022.01)

(52) U.S. Cl.
CPC ........ *H04L 67/125* (2013.01); *H04L 63/1416* (2013.01); *H04L 63/20* (2013.01); *H04L 67/303* (2013.01)

(58) Field of Classification Search
None
See application file for complete search history.

(56) References Cited

U.S. PATENT DOCUMENTS

| | | |
|---|---|---|
| 5,826,250 A | 10/1998 | Trefler |
| 2005/0138169 A1 | 6/2005 | Bahr |
| 2006/0218164 A1 | 9/2006 | Shinmura et al. |
| 2006/0242030 A1 | 10/2006 | Blanchard et al. |
| 2007/0112853 A1 | 5/2007 | Dettinger et al. |
| 2008/0263375 A1 | 10/2008 | Sundstrom et al. |
| 2008/0305832 A1 | 12/2008 | Greenberg |
| 2009/0012949 A1 | 1/2009 | Thompson et al. |
| 2009/0044185 A1* | 2/2009 | Krivopaltsev ...... H04L 41/0806 717/173 |
| 2009/0117949 A1 | 5/2009 | Allen et al. |
| 2011/0264650 A1 | 10/2011 | Tobin et al. |
| 2012/0025476 A1 | 10/2012 | Parmar et al. |
| 2013/0007245 A1* | 1/2013 | Malik .................. H04W 12/37 709/223 |
| 2013/0117804 A1 | 5/2013 | Chawla et al. |
| 2013/0159260 A1 | 6/2013 | Vangompel |

(Continued)

FOREIGN PATENT DOCUMENTS

WO 2008083486 7/2008

*Primary Examiner* — Mohamed Ibrahim
(74) *Attorney, Agent, or Firm* — Thomas | Horstemeyer, LLP

(57) ABSTRACT

Various examples are described for defining automations for client devices enrolled with a management service. A computing environment can cause one or more user interfaces to be shown in a display of an administrator device that include at least one field for generating an automation that includes a trigger, a condition, and an action to automatically be performed when the condition is satisfied. The trigger defines a time at which the management service compares the condition to device profiles generated for client devices enrolled with the management service. The user interface can forecast a number of client devices that will be affected or subject to an automation, and can display results of the automation as it is executed in real time.

20 Claims, 7 Drawing Sheets

(56) References Cited

U.S. PATENT DOCUMENTS

| | | |
|---|---|---|
| 2013/0254401 A1 | 9/2013 | Marshall et al. |
| 2014/0028021 A1 | 9/2014 | Stibel et al. |
| 2016/0006604 A1* | 1/2016 | Freimark ................ H04W 4/50 |
| | | 455/419 |
| 2016/0016238 A1 | 6/2016 | Ishida |
| 2016/0253159 A1 | 9/2016 | Smith et al. |
| 2016/0335816 A1 | 11/2016 | Thoppae et al. |
| 2017/0171354 A1 | 6/2017 | Itogawa |
| 2017/0237630 A1 | 8/2017 | Halmstad et al. |
| 2018/0063373 A1* | 3/2018 | Hardy .................. G06F 3/1226 |
| 2018/0321969 A1* | 11/2018 | Bansal ................ G06F 9/5061 |
| 2019/0296969 A1* | 9/2019 | Zimny .................... H04L 41/28 |

\* cited by examiner

Administrator Console 121

Create Automation 160

Alert User About Device Battery

*Add Description of Automation (Optional)* — 169

Trigger (When)

Device Data (incoming and existing impacted devic — 166a

Filter (If)

Enrollment Status includes (Enrolled) AND AlphaC — 166b

Enrollment Status ⌄ Includes

AlphaCo Battery Health ⌄ Less Tha

Action (Then) — 171a

🟤 DeltaCo App –> Create Ticket

🟤 AlphaCo App –> Send Messag — 171b

---

🔍 AUTOMATION ⌄ › Search Automation Name — 235

Filter Results 8 mins ago

1,500 Results

Group by Device Organization ... ⌄

2,500
2,000
1,500
1,000
500
0
    OG_Windows    OG_iOS    OG_Android

— 240

■ Device Organization Group Names

| Device ID | Platform | OS Version | Enrollment Status | Group Name |
|---|---|---|---|---|
| 15A823 | Windows | 10.0.123 | Enrolled | OG_Windows |
| 42105Z | Android | 6.021 | Enrolled | OG_Android |
| 782B45 | Apple | 11.0 | Enrolled | OG_iOS |
| N18904 | Apple | 10.2 | Enrolled | OG_iOS |
| 512H82 | Android | 6.021 | Enrolled | OG_Windows |
| 6138FR | Windows | 10.0.123 | Enrolled | OG_Windows |
| 98137E | Windows | 10.0.123 | Enrolled | OG_Android |

Administrator Console 121

Insights
Dashboards
My Dashboard
Security Risk
OS Updates
Apps
Patches
Automation
Reporting
Reports
Scheduled Reports
Recent Activity
Sync Status
Settings

Automations > Alert User about Device Battery
Status: Enabled – Last Run: 5 minutes ago – Category: UEM Devices – Created: Nov 11, 2019

Overview   Impact   Activity

[ EDIT ]  [ COPY ]  [ RENAME ]  [ DISABLE ]  [ DELETE ]

Impact: Filter Results
Last 30 Days
400 Results   — 250

Details of Automation 160

Trigger (When) — 169
Device Data – New incoming state change

Filter (If)
Enrollment Status includes (Enrolled) AND AlphaCo Battery Health less than or equal to (35) — 166

Actions (Then) — 171
BetaCo API -> Send a Private Message
DeltaCo API -> Create Ticket
    Short Description    Order New Battery for User

PREVIEWING IMPACTED ENTITIES IN AUTOMATED DEVICE DEFINITIONS

BACKGROUND

Various operating systems offer mobile device management (MDM) capabilities that permit third-party applications to secure and oversee operation of a device. Unified endpoint management (UEM) solutions enable administrators of enterprises and other organizations to also secure and oversee the operation of a multitude of various types of devices having various types of operating systems and MDM capabilities, such as smartphones, desktop computers, laptops, tablets, and peripheral devices. Generally, UEM solutions include a management service hosted in a remote computing environment, where the management service permits administrators to oversee operation of the multitude of devices through a single portal, referred to as an administrator console.

Some UEM solutions permit an administrator to determine a number of devices impacted by a change in policy. However, these solutions typically generate rough estimates, and do not rely on actual states of devices managed by the management service. Additionally, some of these solutions merely create a rule that is matched against incoming device profiles, thereby failing to account for device profiles already stored in memory. Accordingly, it is difficult for administrators to determine a potential impact of a change in a policy defined in the administrator console. For instance, an administrator may be less inclined to roll out a change in policy to a thousand devices enrolled with the management service, when only a subset of those devices should be impacted by the change in policy.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2-5 are example user interfaces that permit administrators to define automations to be performed in association with devices enrolled with the management service.

DETAILED DESCRIPTION

Figure 1:
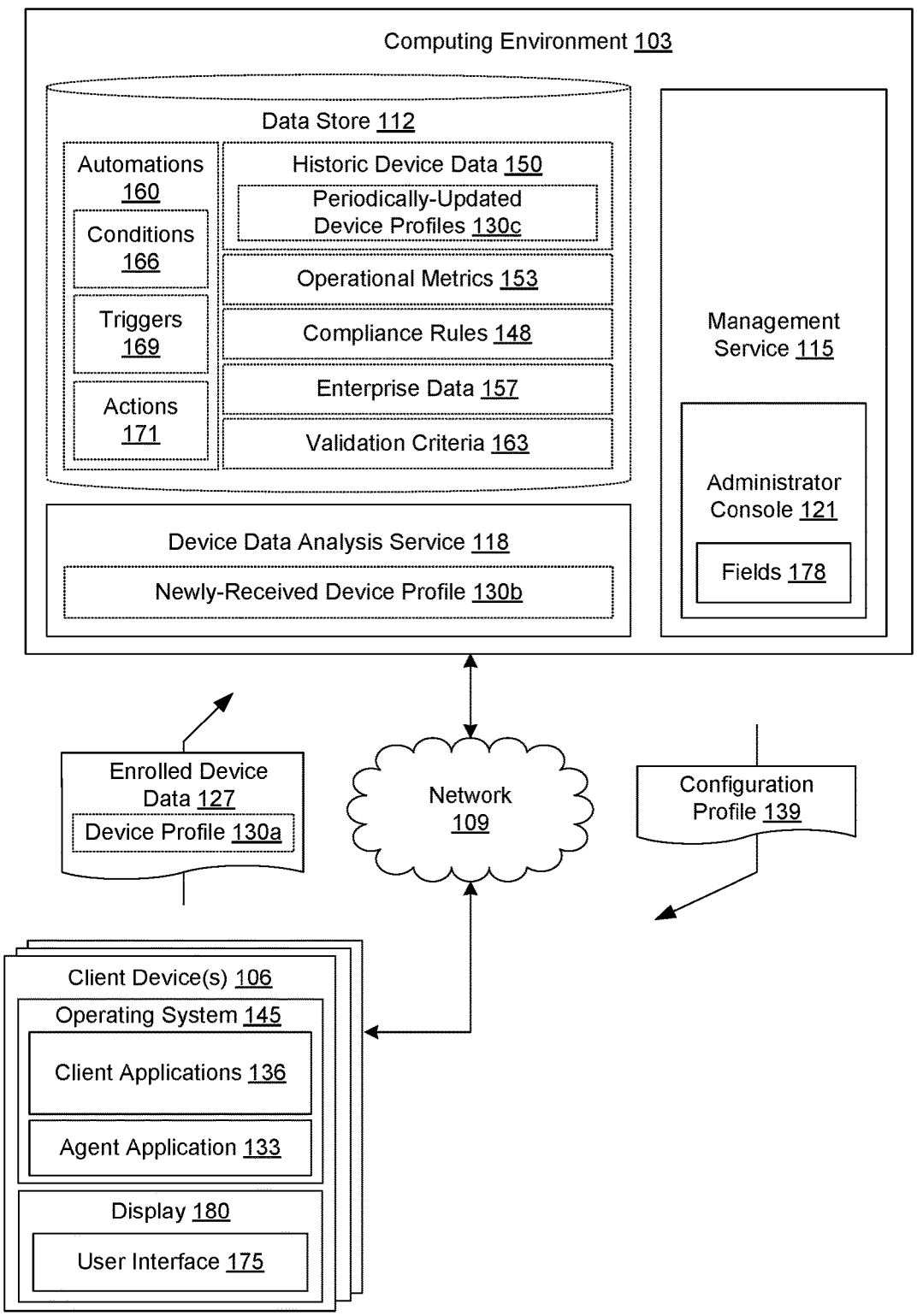
FIG. 1 is a drawing of a networked environment that includes a management service and an administrator console that enable automations to be created and impacted devices to be forecasted.

The present disclosure relates to defining automations for client devices enrolled with a management service as well as dynamically determining information associated with devices affected by automations as the automations are being created. Administrators of an enterprise or other organization, which usually include information technology (IT) personnel, can utilize a management service to secure and oversee operation of devices enrolled with a management service. Through an administrator console, administrators can define actions or events to occur when predefined criteria has been met by one or more devices. For instance, if a state of a device indicates that the device is a security risk, the administrator can specify remedial actions to be taken by the management service, such as removing the device from an enterprise network, requiring the device to perform a virus scan, reformatting the device to a predefined image, or other action that could alleviate the security risk.

While it can be more intuitive to configure devices having common operating systems, hardware, and other software, it becomes difficult to configure devices having increasingly varying operating systems, hardware, application versions, firmware versions, and other specifications. For instance, in bring-your-own-device (BYOD) environments, the devices used by employees can range from devices that utilize the Android® operating system by Google®, the iOS operating system by Apple®, the Windows® operating system by Microsoft®, or other operating system. These devices also can have different versions of operating systems, different security patches, varying user configurations, etc. Additionally, the devices can be manufactured by various device manufacturers and include varying hardware specifications, drivers, and settings.

Assume, for instance, that an administrator intends to install a security patch on all devices in a bring-your-own-device environment. There is a probability that installing the security patch or otherwise incorrectly configuring devices could result in "breaking" a vast amount of devices or, in other words, making the devices non-operational or not function as intended. As such, it is beneficial to have an administrator console that provides the administrator with up-to-date and accurate information of a number of devices affected, subject to, or otherwise impacted by a procedure, while allowing the administrator to dial down the impact of individual devices, permitting the administrator to make more granular decisions or customizations that affect portions of enrolled devices. Additionally, it can be beneficial for the administrator to create automations to be performed when certain criteria is met, allowing the administrator to customize behavior when certain conditions associated with enrolled devices are met.

Additionally, some management services can permit conditions and/or actions to be specified by an administrator console. However, these management services only match conditions against device profiles being received periodically from enrolled devices. In other words, any device profiles received in the past prior to the specification of the condition and action are not used in generating a number of impacted devices to be affected by the condition or action.

Accordingly, in various examples described herein, a management service is described that permits a "trigger" to be specified that determines whether to match a condition against previously-stored device profiles and/or newly-received device profiles corresponding to client devices enrolled with the management service, as will be described. In some examples, the management service is executed in one or more computing devices, where the computing device is directed to enroll a plurality of client devices with a management service. The computing device can cause an administrator console, having one or more user interfaces, to be shown in a display of an administrator device. The administrator console, or the user interface thereof, can include one or more fields that permit the administrator to define (i) a condition associated with the client devices enrolled with the management service, (ii) a trigger that specifies a time at which the at least one computing device matches the condition against a device profile of at least one of the client devices, and (iii) an action to be performed automatically by the at least one computing device when the condition is satisfied.

In some examples, the trigger as defined by the administrator, directs the computing device to match the condition against periodically-updated device profiles of the client devices stored in a data store and/or match the condition against newly-received device profiles of the client devices when the newly-received device profiles are obtained from individual ones of the client devices in the subset. Upon a submission of the condition, the trigger, and the action in the administrator console, collectively referred to as an automation, the computing device can begin matching the condition against at least one of the periodically-updated devices profiles and the newly-received device profiles.

In further examples, the computing device can determine a subset of the client devices to be affected by the condition, trigger, and/or action, and display information associated with individual ones of the client devices in the subset affected by the condition. For instance, the information can include a device name, a device identifier, an operating system, an operating system version, a unique serial number or other identifier, as well as other information associated with individual ones of the client devices enrolled with the management service that match the condition.

Accordingly, technological improvements for conventional device management solutions are described. Notably, example solutions rooted in technology are described for analyzing device profiles in real-time as a condition, trigger, and action are being generated by an administrator in an administrator console, thereby allowing the administrator to be provided with up-to-date metrics such that the administrator can make more granular automations or determine results of various policies for the management service. For instance, before implementing a new policy that requires all devices to migrate from a legacy email application to a new email application, administrators can determine how many devices are currently running the legacy version of the application that will be affected by the policy, as opposed to those currently using the new email application. The metrics can be beneficial in determining the number of devices that will be impacted as a result of the policy change as well as other issues that could occur, for instance, regarding the operation of frequently used features or applications. Additionally, administrators can desire to view information associated with the migration in real time as the migration is being performed.

Turning now to FIG. 1, an example of a networked environment 100 is shown. The networked environment 100 can include a computing environment 103 and one or more client devices 106 in data communication with one another over a network. The network can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include one or more computing devices that are arranged, for example, in a server bank, computer bank, or other arrangement. The computing environment 103 can include a grid computing resource or any other distributed computing arrangement. The computing devices of the computing environment 103 can be located in a single installation or can be distributed among many different geographical locations. The computing environment 103 can also include or be operated as one or more virtualized computer instances executing in one or more computing devices.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 can communicate with the client device 106 remotely over the network, the computing environment 103 can be described as a remote computing environment 103 or a cloud computing environment 103.

The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115, a device data analysis service 118, as well as other applications, services, processes, systems, engines, or functionality not discussed in detail herein. While the device data analysis service 118 is shown separate from the management service 115, in some examples, the device data analysis service 118 can include logic of the management service 115. For instance, the device data analysis service 118 can be a routine or an application programming interface (API) call invoked in the management service 115.

Generally, the management service 115 can manage and oversee the operation of client devices 106, for instance, those enrolled or to be enrolled with the management service 115. In some examples, an organization, such as a company, enterprise, organization, or other entity, can operate the management service 115 to manage or oversee the operation of the client devices 106 of its employees, contractors, customers, or other individuals having accounts with the entity. In some examples, various settings and tasks performed by the management service 115 can be defined by administrators of the management service 115.

For example, if the management service 115 is used to oversee client devices 106 of employees of an enterprise, the administrators can include information technology personnel of the organization tasked with overseeing operation of the client devices 106 enrolled with the management service 115. To this end, the management service 115 can provide an administrator console 121 that permits administrators to define policies and other criteria for a client device 106 to remain in compliance with the management service 115. Additionally, through the administrator console 121, the administrators can specify configurations of the client devices 106 that can be carried out through interaction with an agent application 133 on each of the client devices 106, as will be described.

The device data analysis service 118 can receive enrolled device data 127 collected by the agent application 133 (or other client application 136) on each of the client devices 106, and generate metrics, graphics, or other information that can be useful in evaluating the configuration or performance of the client devices 106 enrolled with the management service 115. The enrolled device data 127 can include data describing particular states or configurations of client devices 106 enrolled with the management service 115. This data for individual client devices 106, in some examples, are referred to as device profiles 130*a* . . . 130*c* (collectively "device profiles 130").

In some examples, a device profile 130 can include an extensible markup language (XML) document, or other hierarchical data object, that include variable names, variable values, and other data pertaining to a state or a configuration of a client device 106. For instance, the device profile 130 for a client device 106 can include a listing of the client applications 136 installed on the client device 106, versions of the client applications 136 and associated settings, hardware settings, software settings, usage statistics, as well as other data.

The device profiles 130 can include newly-received device profiles 130*b*, such as those newly checked in with the management service 115. Additionally, the device profiles 130 can include periodically-updated devices profiles 130*c* that are stored in the data store 112. It is understood that newly-received device profile 130*b* can be referred to as periodically-updated device profiles 130*c* once they are stored in the data store 112.

In some examples, an agent application 133 executable on the client device 106 can generate the device profile 130*a* for transmission to the computing environment 103. In some examples, the agent application 133 periodically generates the device profile 130*a*, for instance, at a predefined interval, such as every two days. Notably, the management service 115 can interact with the agent application 133 on a client device 106 to enroll the client device 106 with the management service 115. Enrollment can include authenticating the client device 106 using login information, such as an email address, username, or password, as well as device information or biometric information. Further, enrollment can include sending an enrollment file to a client device 106 that directs the agent application 133 to configure the client device 106 accordance to settings specified by the administrator in the administrator console 121.

The agent application 133 can include one of several client applications 136 on the client device 106. However, the agent application 133 can vary from other client applications 136 as it has the ability to be registered as a device administrator of the client device 106 through management APIs of an operating system, which can provide the agent application 133 with privileges to control operation of various functions of the client device 106 that are otherwise unable to be performed by non-privileged client applications 136. Further, the agent application 133 can configure a client device 106 in accordance with data provided to the client device 106 for the management service 115, referred to as a configuration profile 139. In some examples, the configuration profile 139 can include an XML document, or other similar data object, that causes the agent application 133 to configure the client device 106 in accordance with settings or other parameters specified in the XML document. Additionally, the configuration profile 139 can include specifications of particular data for the agent application 133 to collect.

The management service 115 or the agent application 133 can instruct the client device 106 to check-in with the management service 115 periodically, randomly, or based on a check-in schedule by sending enrolled device data 127 to the computing environment 103. In some examples, the enrolled device data 127 can include data pertaining to the configuration or operation of the client device 106. For instance, in some examples, the enrolled device data 127 can include the device profile 130 that includes hardware or software settings of the client device 106.

In the device profile 130, the hardware settings can include user-specified configurations and other data pertaining to a display 180, camera, speaker, keyboard, mouse, global positioning system (GPS), other geo-location hardware, or other hardware of the client device 106. Also in the device profile 130, the software settings can include user-specified configurations or other data pertaining to an operating system 145, client applications 136, or other software of the client device 106. For instance, software settings can include a list of installed client applications 136, as well as various user-specified configurations or settings of the installed client applications 136.

The enrolled device data 127 and the device profile 130 can include an XML file, data structure, or other data object having data that can be sent over the network 109. Traditionally, the enrolled device data 127 collected by the agent application 133 can be evaluated by the management service 115 to determine whether a client device 106 is in compliance with one or more compliance rules 148 specified by the administrators.

The data stored in the data store 112 can include, for example, historic device data 150, operational metrics 153, compliance rules 148, enterprise data 157, automations 160, validation criteria 163, as well as other data. Historic device data 150 can include data pertaining to a client device 106 enrolled or managed by the management service 115 stored in the data store 112. For instance, when a client device 106 checks in with the management service 115, the management service 115 can store the enrolled device data 127 (or other data received during the check-in), or the device profile 130 of a given client device 106, as historic device data 150. As such, the management service 115 can maintain historic device data 150 for client devices 106 enrolled with the management service 115, where the historic device data 150 describes past and most-recent configurations of the client devices 106. Further, when a client device 106 checks in with the management service 115, for instance, by communicating enrolled device data 127 to the management service 115, the management service 115 can match the device profile 130 against one or more conditions 166, as will be described.

Operational metrics 153 can include metrics derived from enrolled device data 127 that describe operation of the client devices 106 enrolled with the management service 115. In some examples, operational metrics 153 can be generated for a single one of the client devices 106. In other examples, operational metrics 153 can be generated for groups of client devices 106 enrolled with the management service 115. In some examples, operational metrics 153 can include a number of devices having a particular version or type of operating system installed thereon. In other examples, operational metrics 153 can include a number of devices having a particular client application installed thereon that requires a software license. In other examples, operational metrics 153 can include health scores describing an operation of one or more client devices 106, or an overall system health score describing operation of the management service 115 based on parameters specified by the administrators. In further examples, the operational metrics 153 can include a number of client devices 106 to be affected by a change in policy implemented through the management service 115 or the administrator console 121.

Compliance rules 148 can include criteria specified by administrators to secure or oversee operation of client devices 106 enrolled with the management service 115. For instance, administrators can specify criteria for a client device 106 to be in compliance with the management service 115. If a client devices 106 is not in compliance with the management service 115, the management service 115 can perform actions predefined by the administrators, such as denying access to enterprise data 157, reconfiguring a client device 106, notifying an operator of the client device 106, as well as other actions.

Enterprise data 157 can include data served up by the management service 115 which can include enterprise documents, emails, instant messaging communications, network printer data, or other data. Automations 160 can include conditional statements specified by administrators having criteria that, when met, cause a predefined task to be performed, as will be discussed. To this end, automations 160 can include, for instance, conditions 166, triggers 169, and actions 171 that can be specified by an administrator using the administrator console 121.

In some examples, an automation 160 can be described as having one or more IF-THEN statements in some examples. For instance, an administrator can specify that, if a client device 106 has a particular type or version of operating system 145 installed thereon, then the management service 115 will cause a particular version of a client application 136 to be installed on the client device 106 that is compatible with the type or version of operating system 145. In other examples, an automation 160 can be described as having one or more WHEN-IF-THEN statements in some examples. Using the example above, an administrator can specify that, when a client device 106 checks in with the management service 115, check to see if a client device 106 has a particular type or version of operating system 145 installed thereon, then cause a particular version of a client application 136 to be installed on the client device 106 that is compatible with the type or version of operating system 145. The when statement can be referred to as the trigger 169, the if statement can be referred to as the condition 166, and the then statement can be referred to as the action 171, as can be appreciated.

In various examples, the management service 115 can generate one or more user interfaces 175 having fields that obtain information regarding a desired configuration of client devices 106 enrolled (or to be enrolled) with the management service 115. The user interfaces 175 can be accessed by an administrator through the administrator console 121, for instance, upon successful authentication using administrator credentials.

Using these user interfaces 175, administrators can provide information regarding how the administrators desire the client devices 106 to operate. In one example, the administrators can specify one or more client applications 136 to be installed on the client devices 106. In yet another example, the administrator can specify settings to be configured on the client devices 106, such as Wi-Fi network settings, virtual private network (VPN) settings, email server settings, or other settings. The agent application 133 can configure the device in accordance with these settings. In another example, the administrator can specify settings that cause the client device 106 to toggle between modes of operation, such as during work hours or when the client device 106 is in a particular geo-location.

Even further, the management service 115 can generate one or more user interfaces 175 having fields 178 that obtain information regarding an automation 160 to be defined and implemented in the computing environment. The one or more user interfaces 175 can be accessed in the administrator console 121 in some examples. For instance, one or more of the fields 178 can be used by the administrator to define a condition 166, a trigger 169, and an action 171, which collectively can be referred to as an automation 160 as the management service 115 will automatically perform the action 171 upon the trigger 169 if the condition 166 is met.

In one example, an administrator can specify that, when a client device 106 has checked in with the management service 115 (the trigger 169), the management service 115 is to determine if a client device 106 has an out-of-date version of a security patch installed thereon (the condition 166), and, if so, then the management service 115 will automatically take action to cause the client device 106 to update to a most-recent version of a security patch (the action 171). Prior to the creation of an automation 160, or prior to determining a number of devices to be affected by the automation 160, the conditions 166, triggers 169, and actions 171 defined by an administrator can be validated using the validation criteria 163. The validation criteria 163 can include criteria that requires automations 160 to follow a predetermined format, use one or more valid values, or similar parameter as can be appreciated.

Based on the settings specified by an administrator in the user interfaces 175, the management service 115 can generate a configuration profile 139 that is published for one or more client devices 106. When published, the agent application 133 on the client device 106 can identify the configuration profile 139 as being applicable to the client device 106 and, as a result, can download and configure the client device 106 in accordance with the settings set forth in the configuration profile 139. Further, the one or more user interfaces 175 can permit the administrator to specify compliance rules 148 as well as actions to be performed based on the compliance rules 148.

In some examples, the configuration profile 139 can direct the agent application 133 to configure hardware or software functionality of a client device 106 such that the client device 106 operates in conformance with the compliance rules 148 or other criteria specified in the configuration profile 139. Additionally, the management service 115 can identify when the client device 106 is not in conformance with the compliance rules 148 and can take appropriate remedial actions, such as denying access to enterprise data 157, enterprise applications, or performing other actions.

In some examples, the management service 115 communicates with the agent application 133 or other client application 136 executable on the client device 106 to determine whether vulnerabilities exist on the client device 106 that do not satisfy policies defined by an administrator. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of client applications 136, or other vulnerability as can be appreciated.

The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, a virtual reality or augmented reality device, a peripheral device, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include the operating system 145, which can be configured to execute various client applications 136, such as the agent application 133, as well as other applications. Some client applications 136 can access enterprise data 157 and other network content served up by the computing environment 103 or other servers, thereby rendering a user interface 175 on a display 180, such as a liquid crystal display (LCD), touch-screen display, or other type of display device. To this end, some client applications 136 can include a browser or a dedicated application, and a user interface 175 can include a network page, an application screen, or other interface. In some examples, a network page can include a web page having source code defined in hypertext markup language (HTML), cascading style sheets (CSS), Javascript, jQuery, or other applicable client-side web-based scripting language. Further, other client applications 136 can include device management applications, enterprise applications, social networking applications, word processors, spreadsheet applications, media viewing applications, instant messaging applications, or other applications.

It is understood that, in some examples, client devices 106 associated with sufficient administrator credentials can be referred to as administrator devices. The administrator devices, like the client devices 106, are capable of accessing the administrator console 121 through the client applications 136, such as a web browser application.

Figure 2:
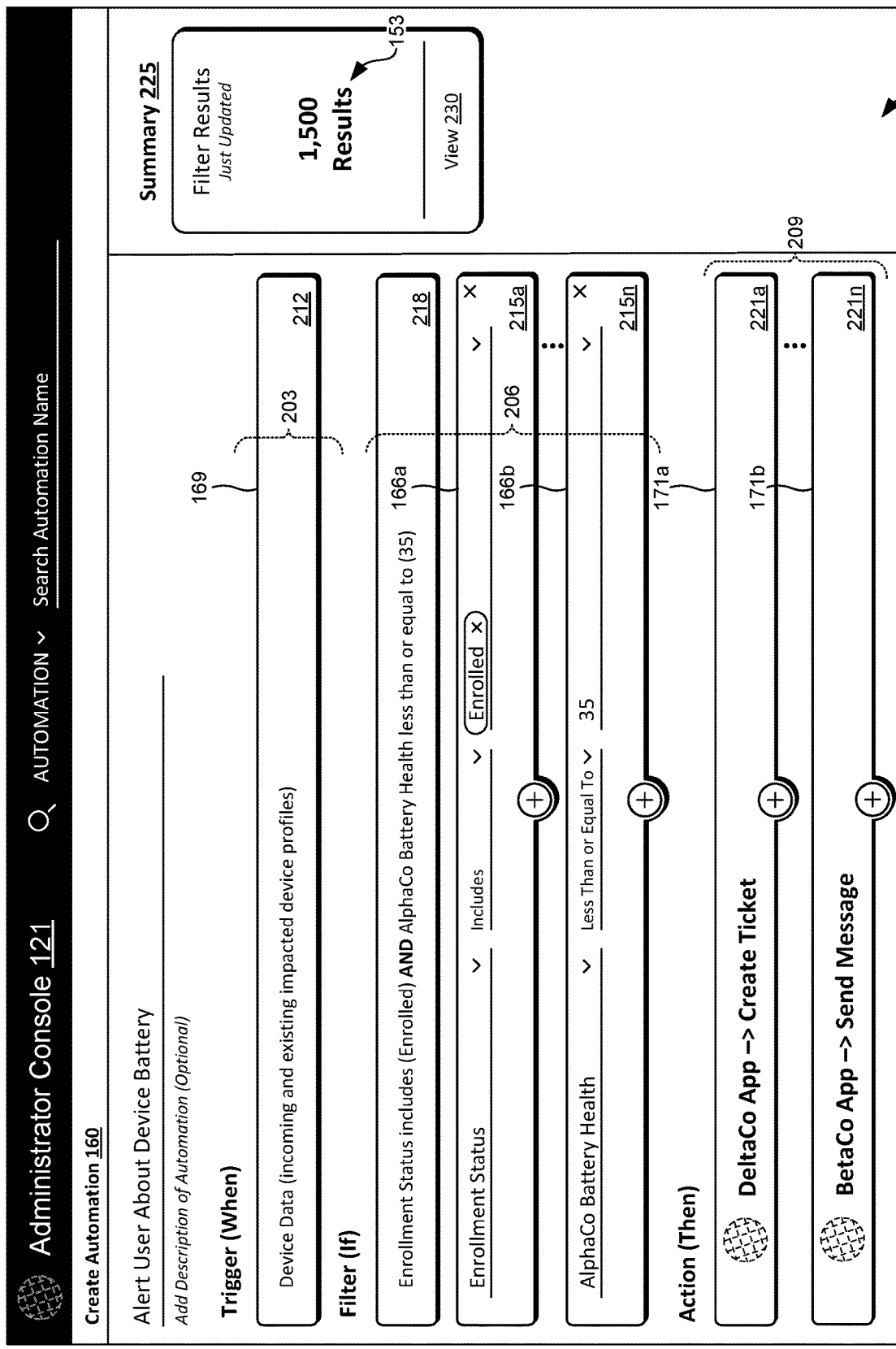

Referring next to FIG. 2, an example of a user interface 175 is shown. More specifically, the user interface 175 of FIG. 2 includes an example of the administrator console 121 that permits an administrator to create an automation 160, referred to in FIG. 2 as "Alert User About Device Battery." In this example, the automation 160 creates a ticket with a third-party service that instructs a new battery order to be placed when a battery health level of an AlphaCo device is below a threshold, also while notifying the end user of the client device 106 that a new battery will be mailed. While a single user interface 175 is shown, it is understood that multiple user interfaces 175 can be used to create an automation 160 in some examples.

An automation 160 can include one or more conditional statements specified by administrators in the user interface 175 having criteria associated with client devices 106 enrolled with the management service 115 that, when met, cause a predefined task to be performed. In some examples, a conditional statement can be generated based at least in part on values specified in a first subset of fields 178 corresponding to a WHEN statement (the trigger 169), values specified in a second subset of fields 178 corresponding to an IF statement (the condition 166), and values specified in a third subset of the fields 178 corresponding to a THEN statement (the action 171), as will be described.

For instance, as shown in the user interface 175 of FIG. 2, a first region 203 of the user interface 175 can receive a specification of a WHEN statement (a trigger 169), a second region 206 can receive a specification of an IF statement (a condition 166), and a third region 209 of the user interface 175 can receive a specification of a THEN statement (an action 171 to be performed when the trigger 169 and the condition 166 are met). The user interface 175 thus enables the administrator to define granular automations 160 only affecting a certain subset of client devices 106 enrolled with the management service 115, as can be appreciated.

In some examples, the first region 203 can include one or more trigger cards 212. The trigger card 212 can define the trigger 169 that specifies when the management service 115 should match a condition 166. For instance, in FIG. 2, the trigger card 212 indicates that the one or more conditions 166 will be matched against incoming or newly-received device profiles 130.

The second region 206 can include one or more condition cards 215a ... 215n (collectively "condition cards 215"). Each of the condition cards 215 can include fields 178 that allow the administrator to specify values to create a valid IF statement. In one example, the administrator can select "Enrollment Status," "includes," and "Enrolled" in the condition card 215 to arrive at the first condition card 215a, which is shown as being configured. As such, an action 171 defined for the automation 160 will only be performed on a client device 106 if the client device 106 is enrolled with the management service 115.

The condition created in the first condition card 215a can be further narrowed through configuration of additional condition cards 215n. For instance, the configuration of the second condition card 215n will create an AND condition between the first condition card 215a and the second condition card 215n. As such, the administrator can further define the IF statement by configuring additional condition cards 215, for instance, until a complete IF statement has been customized. Through use of the user interface 175, an administrator can "program" or develop sophisticated automations 160 without the use of complicated programming languages or service-specific APIs, as can be appreciated. The completed conditional statement can be shown in a summary condition card 218.

As can be appreciated, in place of "Enrollment Status," the administrator can choose from other potential parameters, such as "Platform," "Platform Version," "Is App Installed," "App Install Time," "Update Install Time," or other parameter useful for device management. Also, in place of "Includes," the administrator can select "Equals," "Is Greater Than," "Is Less Than," "Is Equal To or Greater Than," Is Equal To or Less Than," "Is a Substring of," or other parameter. The "Search for Value" field in some example can receive free-form text or a list of likely values given a specification of the first two fields, such as "Enrollment Status" and "Includes."

Turning now to the third region 209, the user interface 175 can include one or more action cards 221a ... 221n (collectively "action cards 221"). Like the condition cards 215, each of the action cards 221 can include fields that allow the administrator to specify values to define one or more actions to be automatically performed by the management service 115 when the criteria specified in the WHEN and IF statement has been met. In some examples, action cards 221 can correspond to an application or service, including a third-party action or service. To this end, an administrator can select an action card 221 corresponding to a third-party application or service to direct the third-party application or service to perform a predetermined task when the IF condition has been satisfied. For instance, as shown in FIG. 2, the action card 221 for the "DeltaCo App" has been selected and configured to create a ticket and the "BetaCo App" has been selected to send a message when the criteria in the WHEN and IF statements has been satisfied.

The user interface 175 can further include a summary region 225. The summary region 225 can include one or more operational metrics 153 generated based on the WHEN and IF statement created through configuration of the trigger cards 212 and the condition cards 215, respectively, and/or the THEN statement created through configuration of the action cards 221. In some examples, an operational metric 153 can include a number of client devices 106 enrolled with the management service 115 that would be affected by the automation 160. Further, in some examples, this operational metric 153 can be shown relative to another operational metric 153, such as a total number of client devices 106 enrolled with the management service 115. For instance, based on the IF statement specified in FIG. 2 ("IF Enrollment Status includes Enrolled and AlphaCo Battery Health is less than or equal to 35"), the number of client devices 106 affected would include 1,500 devices out of 3,000 total devices enrolled with the management service 115. In other examples, the number of affected or impacted client devices 106 can be shown relative to another operational metric 153, such as a number of client devices 106 in a particular user group, having a particular configuration or specification, or other operational metric 153 as can be appreciated.

In some examples, the one or more of the operational metrics 153 shown in the user interface 175 can be generated or updated dynamically and in real-time. In other words, while a user customizes the WHEN statement, the IF statement, and/or the THEN statement in the user interface 175, the number of affected client devices 106 shown can be updated based on the customization. To this end, in some examples, when a change to a field or a value in the user interface 175 is detected, the management service 115 can generate and execute a query. In some examples, the management service 115 can execute the query to determine a number of the client devices affected by the one or more conditional statements made in the user interface 175. In other examples, the management service 115 can execute the query to identify information associated with individual ones of the client devices affected by the one or more conditional statements made in the user interface 175, as will be described.

To generate one or more of the operational metrics 153, in some examples, the management service 115 can execute the query on a database of device profiles 130, such as those stored in the data store 112 as historic device data 150. The query can be generated based on the conditional statement generated in the user interface 175. In other words, the query can be generated based on the trigger 169, the condition 166, and the action 171. For example, given the first condition card 215a having the conditional statement of "Enrollment Status includes Enrolled and AlphaCo Battery Health less than or equal to (35)," an example of a structured query language (SQL) query can include:

```
SELECT devices FROM device_profile_table WHERE
enrollment_status='enrolled' AND battery_health<='35',
``` which would return a data structure having each device with enrolled with the management service 115 having a battery health metric that is less than or equal to 35, potentially along with any other data stored in a row associated with the devices. Another example of a SQL query can include:

```
SELECT COUNT(*) FROM device_profile_table WHERE
enrollment_status='enrolled' AND battery_health<='35',
``` which would return only the number of client devices 106 (1,500 in the example of FIG. 2) being enrolled with the management service 115 and having a battery life less than or equal to 35 or, in other words, a number of the client devices 106 that would be affected by the trigger 169, the conditions 166, and the actions 171 shown in the user interface 175 of FIG. 2.

The user interface 175, in some examples, can include a network page. In these examples, the query can be generated as a background process using an asynchronous javascript and extensible markup language (AJAX) script included in source code of the network page. In other words, the network page is not refreshed and the administrator is not redirected to another network page. Rather, the operational metrics 153 shown in the summary region 225 (or other region) are updated dynamically and in real-time. Alternatively, a Flash® by Adobe® application, or similar application, can be included in the network page to make POST or GET calls without causing a refresh or a navigation to another network page. In other examples, a jQUERY script or a $.getJSON script can be used to make POST or GET calls without causing a refresh or a navigation to another network page.

Further, in some examples, prior to generating and executing the query, the one or more triggers 169, conditions 166, and actions 171 created by the administrator (through interaction with the trigger cards 212, condition cards 215, and action cards 221) can be validated based at least in part on validation criteria 163. Validation criteria 163 can include criteria that requires the one or more triggers 169, conditions 166, and/or actions 171 to follow a predetermined format, use one or more valid values, or similar parameter as can be appreciated. For example, if the administrator selected the value of "Platform" for a field 178 in the second condition card 215n (instead of "AlphaCo Battery Health"), a valid value for the field 178 can include "Apple® iOS," "Android®," "Linux," "Windows®," or other platform.

While the summary region 225 can be beneficial in quickly determining a number of client devices 106 that will be affected by the automation 160, for instance, if the automation 160 were saved and executed, in some examples, more information pertaining to the affected client devices 106 may be needed. As such, in some examples, the summary region 225 of the user interface 175 can include a user interface component 230 that provides additional information about the client devices 106, such as the 1,500 client devices 106 identified in FIG. 2. The user interface component 230 can be selected or otherwise manipulated to present additional information about the client devices 106.

In some examples, the user interface 175 can include additional basic information about what the management service 115 will do to carry out the automation 160. For example, the user interface 175 can show the number of client devices 160 that will be impacted by the automation 160 and the number of actions that will be taken by the management service 115. If 1000 devices are affected by the automation, and 3 actions are performed per automation, the total number of actions is 3000, where the 3000 can be shown in the user interface 175.

For instance, referring now to FIG. 3, a modified form of the user interface 175 is shown, where a dialog 235 is expanded in the user interface 175. As can be appreciated, the dialog 235 can be shown in response to the selection of the user interface component 230 of FIG. 2, and can include information about the 1,500 client devices 106 identified based on the one or more triggers 169, conditions 166, and actions 171.

In some examples, the dialog 235 of the user interface 175 can include a chart 240 that shows a breakdown of client devices 106 by a characteristic, such as platform or user group. For instance, the chart 240 shows a breakdown of the 1,500 client devices, where some are associated with the OG Windows user group, the OG iOS user group, and the OG Android user group. The user groups can be created and defined by administrators in the administrator console 121, for instance, to perform actions on client devices 106 based on their platform. The administrator can adjust the user interface 175 to view other charts 240 and breakdowns of client devices 106 satisfying the criteria. For instance, the "Device Organization" group can be adjusted to another characteristic of the client devices 106, changing the user interface 175 and/or charts 240 accordingly.

Additionally, the dialog 235 can include a table 245 or other listing of individual ones of the client devices 106 identified based on the criteria. In other words, the dialog 235 can include a subset of the client devices 106 identified from a query performed using the automation 160. As a result, the administrator is provided with additional details that permit the administrator to determine whether the automation 160 obtains an intended subset of the client devices 106. For instance, it is beneficial for the administrator to determine that client devices 106 that should not be subject to the automation 160 are not included in the table 245. As a result, administrators are able to define automations 160 that or more granular while not risking the inclusion of client devices 106 not intended to be captured in the automation 160.

The table 245 may include data showing client devices 106 that match the conditions 166 specified in the user interface 175 of FIG. 2. In some examples, the table 245 can include filter attributes as a column in addition to or in place of default columns. Through the administrator console 121, the administrator can add or remove columns, filter or search the client devices 106 listed in the table 245, and sort client devices 165 in the table 245. In some examples, the table 245 includes default columns, such as "Last Seen," "Friendly Name," "Username," "Platform," "OS Version," "Serial Number," "Device Organization Group Name," or other characteristic.

Turning now to FIG. 4, another example user interface 175 of the administrator console 121 is shown. In some situations, it is useful to monitor an automation 160 as it is executing. For instance, an administrator can create an automation 160 to upgrade client devices 106 from a legacy version of an operating system to a new version. When the administrator deploys or otherwise makes an automation 160 active, the management service 115 will begin checking the conditions 166 against device profiles 130 of the client devices 106. It can be beneficial for the administrator to monitor the upgrade, for instance, to determine whether the upgrades are actually occurring on intended client devices 106 in a timely manner.

As such, in FIG. 4, the user interface 175 includes a portion of the administrator console 121 that permits the administrator to monitor an active automation 160. The user interface 175 includes a listing of the criteria specified in the automation 160 shown in FIG. 2. For instance, the trigger 169, the conditions 166, and the actions 171 are shown as being listed. For instance, the automation 160 shown in FIGS. 2, 3, and 4 can include those enrolled with the management service 115 that have an "AlphaCo Battery Health" less than or equal to 35.

A results card 250 illustrates a number of the client devices 106 that the automation 160 has been matched against that satisfy the criteria of the automation 160. For instance, FIG. 4 illustrates that "400 Results" have occurred over the last 30 days. It is understood that the automation 160 of FIG. 4 is only matched against device profiles 130 as they are periodically received from the client devices 106, as specified in the trigger 169. Otherwise, the actions 171 specified in the automation 160 may have occurred quicker for the 1,500 devices referenced in the example of FIG. 2. By selecting or otherwise manipulating the results card 250, a dialog 235 can be shown that lists the individual ones of the client devices 106 in the 400 results. The dialog 235 can be the same as or similar to the dialog 235 shown in FIG. 3. Additionally, through the user interface 175 of FIG. 4, the administrator can edit, copy, rename, disable, and delete one or more automations 160.

In some examples, the user interface 175 can include a bar chart or other graph depicting an impact of an automation 160 over time. For instance, a total number of runs of the automation 160 can be plotted on a y-axis of a chart over time on the x-axis. In some examples, by default, the user interface 175 can show the past seven days, while allowing a simple toggle or drop-down user interface component to change the relative date range between "Last 24 hours," "Last 7 Days," "Last 30 Days," etc. In some examples, the data shown in the user interface 175 can be pulled from logs detailing tasks performed by the management service 115 when executing an automation 160. In some examples, the history of an automation 160 can show a total number of workflow executions (or "runs") instead of each action performed by the management service 115.

Figure 5:
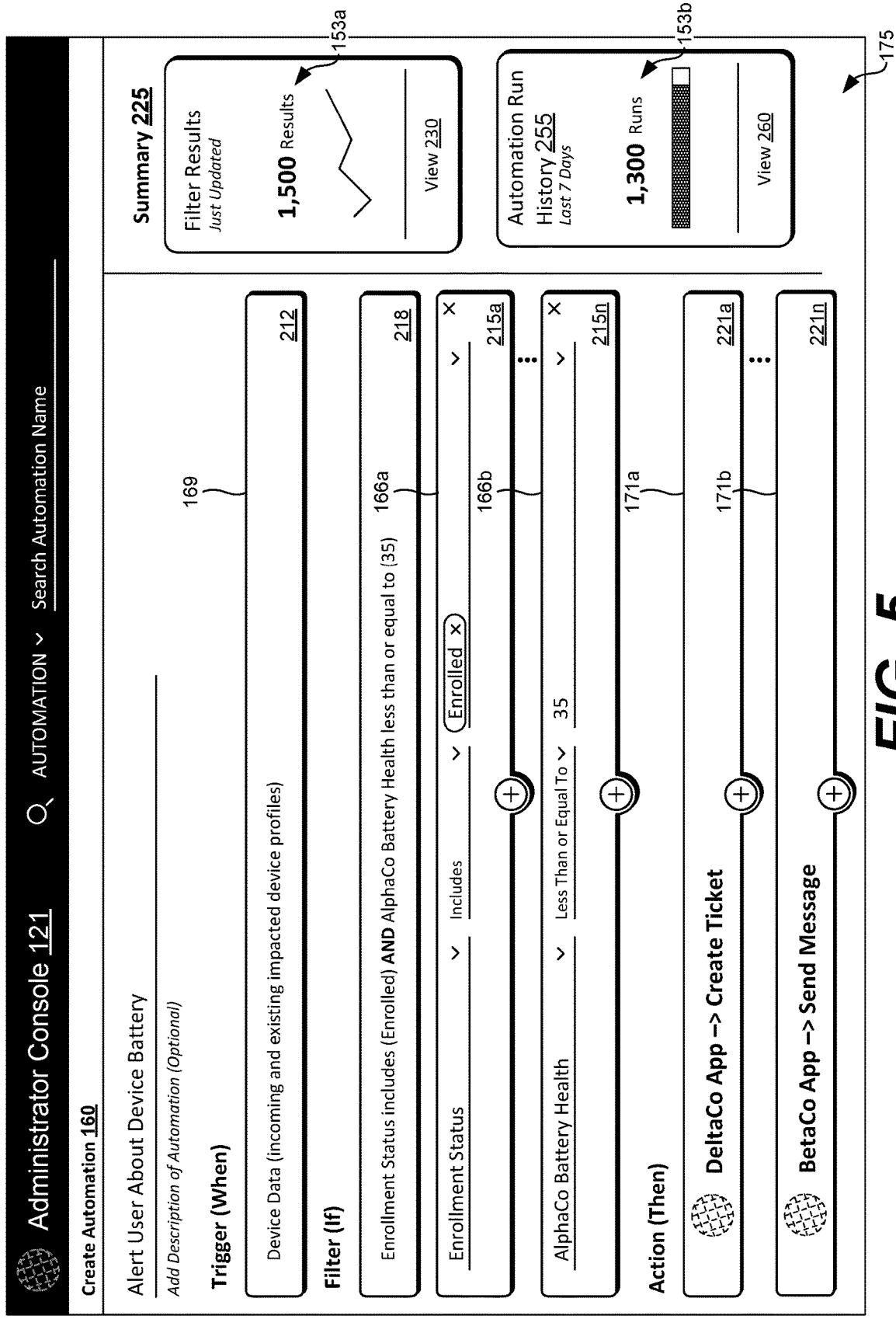

Referring now to FIG. 5, another example of the user interface 175 of FIG. 2 is shown. However, with respect to FIG. 5, it is assumed that the automation 160 specified in the user interface 175 has been saved and is active. In other words, the management service 115 is actively matching the trigger 169, the conditions 166, and the actions 171 against device profiles 130 as they are received by the management service 115. The user interface 175 can be shown for the administrator to edit the automation 160 or view an automation run history 255.

For example, in addition to displaying a number of the client devices 106 affected in the summary region 225, the summary region 225 can further include the automation run history 255. The automation run history 255, like the results card 250 of FIG. 4, can illustrate a number of the client devices 106 that the automation 160 has been matched against that satisfy the criteria of the automation 160. FIG. 5, as an example, illustrates that "1,300 Runs" of the automation have occurred over the last 7 days. As can be appreciated, by selecting or otherwise manipulating a view user interface component 260, a dialog 235 can be shown that lists the individual ones of the client devices 106 subject to the 1,300 runs. The dialog 235 can be the same as or similar to the dialog 235 shown in FIG. 3.

Notably, the dialog 235 or other portion of the user interface 175 can present data of to the client devices 106 enrolled with the management service 115 such that the administrators can make informed decisions pertaining to overseeing and configuring the client devices 106. For instance, based on the data presented in the user interface 175 for individual ones of the client devices 106, the administrators can determine whether to create new automations 160, modify existing policies, or perform other actions as needed. To assist with the presentation of data collected from the client devices 106, the management service 115 or the device data analysis service 118 can generate operational metrics 153 using the enrolled device data 127 that describes client devices 106 matching criteria specified in an automation 160, for instance, while the automation 160 is being configured in the user interface 175 (prior to completion and/or submission of the automation 160), as shown in the summary region 225. Additionally, the management service 115 or the device data analysis service 118 can generate operational metrics 153 using the enrolled device data 127 that describes client devices 106 matching criteria specified in an automation 160 as the automation 160 is being executed by the management service 115, as shown in the automation run history 255.

Figure 6A:
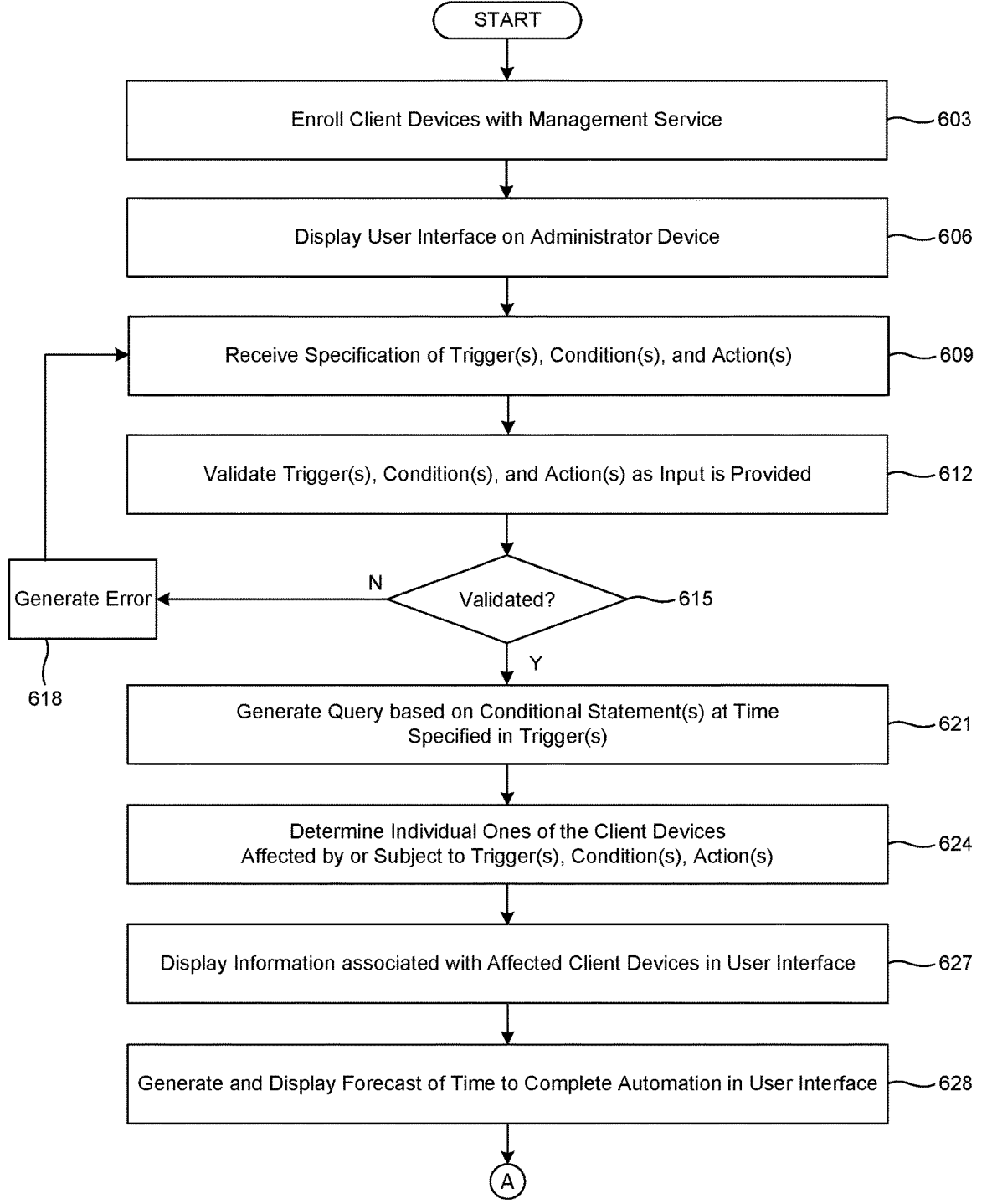
FIGS. 6A and 6B show a flowchart describing an example operation of a management service according to various examples.
Figure 6B:
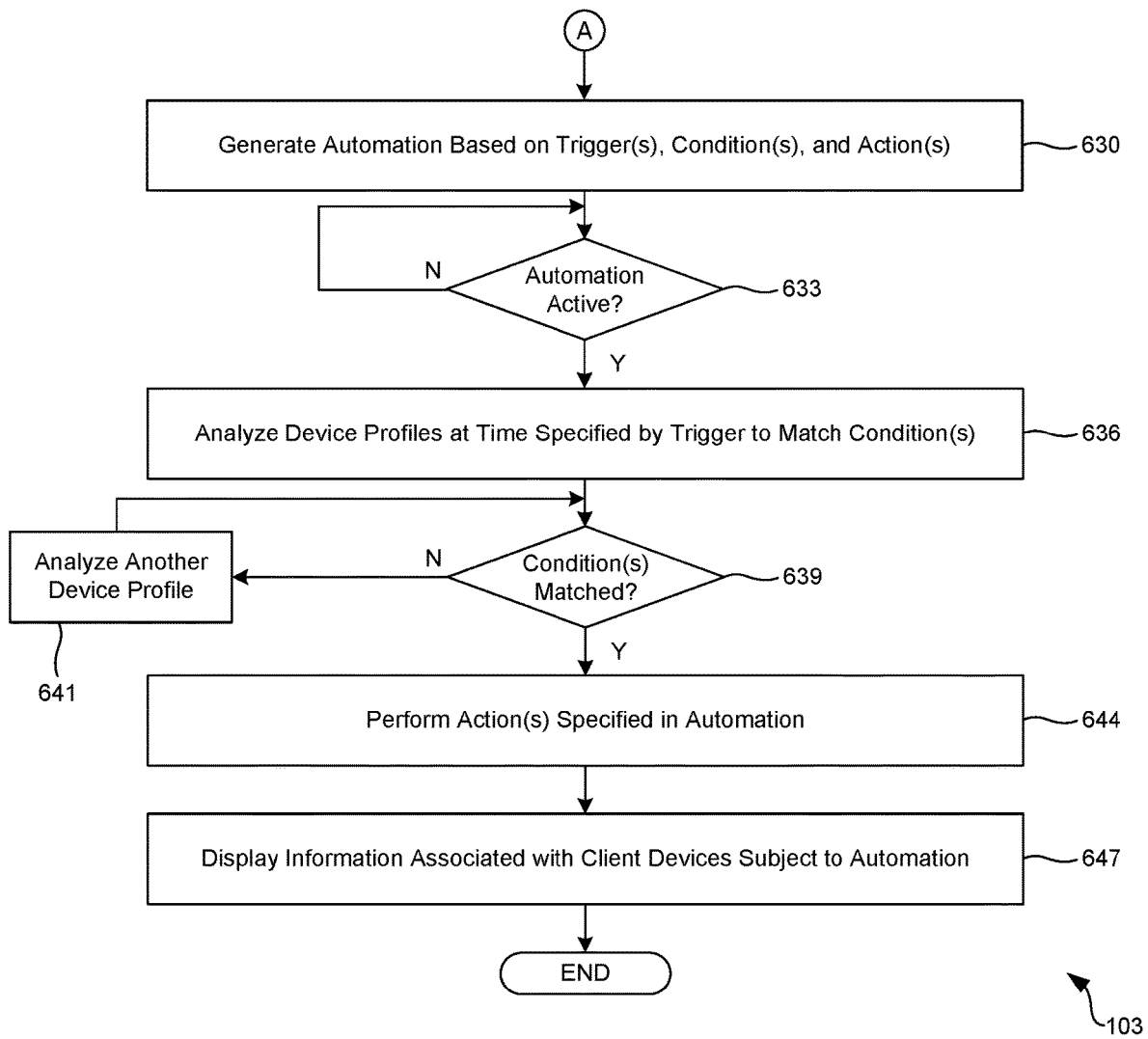

Referring next to FIGS. 6A and 6B, a flowchart is shown that provides one example operation of the management service 115, the device data analysis service 118, or the administrator console 121 according to various examples. The flowchart of FIGS. 6A and 6B can be viewed as depicting an example of elements of a method implemented by the computing environment 103 executing in the networked environment 100 according to one or more examples. The separation or segmentation of functionality as discussed herein is presented for illustrative purposes only.

Beginning with step 603 shown in FIG. 6A, the computing environment 103 can enroll client devices 106 with the management service 115. In some examples, the computing environment 103 can interact with the agent application 133 to enroll a client device 106 with the management service 115. For instance, a user of a client device 106 can install an instance of the agent application 133 on his or her client device 106 and, thereafter, can provide authentication information to access enterprise data 157 on the client device 106. The agent application 133 can check-in with the management service 115 such that the agent application 133 is registered as a device administrator of the client device 106 through management APIs of an operating system 145. As a result, the agent application 133 is provided with privileges to control and manage operation of various functions of the client device 106.

In step 606, the computing environment 103 can display one or more user interfaces 175 on an administrator device. For instance, the management service 115 can provide an administrator console 121 having one or more user interfaces 175 that permit administrators to define policies and other criteria for a client device 106 to remain in compliance with the management service 115. Through the administrator console 121, the administrators can specify configurations of the client devices 106 that can be carried out through interaction with an agent application 133 on each of the client devices 106.

Additionally, through one or more fields 178 of a user interface 175, the administrator console 121 can enable administrators to create and customize automations 160, which can include conditional statements specified by administrators having criteria that, when met, cause a predefined task to be performed automatically. For instance, the automations 160 can include one or more triggers 169 specifying when an automation 160 should be executed or otherwise carried out by the management service 115, conditions 166 specifying parameters to identify a subset of the client devices 106 enrolled with the management service 115, and actions 171 to be performed when the condition 166 are met.

Next, in step 609, the computing environment 103 can receive a specification of one or more triggers 169, conditions 166, and/or action 171, for instance, in the administrator console 121. In some examples, the triggers 169 can be generated based at least in part on values specified in a first subset of fields corresponding to a WHEN statement, the conditions 166 can be generated based at least in part on values specified in a second subset of the fields 178 corresponding to an IF statement, and the actions 171 can be generated based at least in part on values specified in a third subset of the fields 178 corresponding to a THEN statement.

As shown in the user interface 175 of FIG. 2, the first region 203 of the user interface 175 can receive a specification of a WHEN statement (the trigger 169), the second region 206 of the user interface 175 can include a specification of an IF statement (the condition 166), and the third region 209 of the user interface 175 can receive a specification of a THEN statement having one or more actions 171 to be performed when the one or more conditions 166 are met.

In one example, an administrator can specify that, when a client device 106 checks in with the management service 115, the management service 115 should check to see if a client device 106 has a been rooted or jailbroken and, if so, then the management service 115 should direct the agent application 133 to no longer provide access to enterprise data 157. The when statement can be referred to as the trigger 169, the if statement can be referred to as the condition 166, and the then statement can be referred to as the action 171, as can be appreciated.

To execute or otherwise carry out automations 160, the management service 115 can periodically receive device profiles 130 from client devices 106 enrolled with the management service 115 or otherwise access device profiles 130 stored in the data store 112, for instance, in response to a past check in. Once a device profile 130 has been accessed in accordance with the trigger 169, the management service 115 can compare the device profile 130 to the conditions 166 set forth in the automation 160, as will be described.

In step 612, the computing environment 103 can validate the one or more triggers 169, conditions 166, and actions 171, for instance, as input is provided in the user interface 175. In some examples, a script or a watch event for a user interface 175 is executed as a background process to identify changes to any fields 178 or values of the fields 178 while the user interface 175 is shown on a display 180 of an administrator device. In some examples, an AJAX script is included in source code of the network page, where the AJAX script is configured to detect changes to the user interface 175, determine whether the conditional statement complies with validation criteria 163, and execute queries to update operational metrics 153 shown in the summary region 225, or other region, in real-time.

Thereafter, in step 615, the computing environment 103 can determine whether the triggers 169, conditions 166, and actions 171 have been validated, for instance, by determining whether validation criteria 163 has been satisfied. Validation criteria 163 can include criteria that requires the trigger 169, conditions 166, and actions 171 to follow a predetermined format, use one or more valid values, or similar parameter as can be appreciated.

If the conditional statement is not validated, the process can proceed to step 618. In step 618, the computing environment 103 can generate an error. For instance, in some examples, an error card (not shown) can be generated in the user interface 175 when one or more of the triggers 169, conditions 166, or actions 171 created by an administrator does not comply with validation criteria 163. The error card can include at least a portion of the conditional statement specified by the administrator; however, the value that does not comply with the validation criteria 163 is emphasized in a portion of the conditional statement. After the error has been shown in the user interface 175, the process can revert to step 609 to continue receipt of a specification of the one or more triggers 169, conditions 166, and actions 171.

Alternatively, if the conditional statement has been validated in step 615, the process can proceed to step 621. In step 621, the computing environment 103 can generate a query based on the conditions 166 specified by the administrator in the administrator console 121, for instance, at a time specified in the trigger 169. For instance, the administrator can specify the timing in the trigger 169 to direct the management service 115 to perform at least one of matching the conditions 166 against periodically-updated device profiles 130 of the client devices 106 stored in a data store 112 and/or matching the conditions 166 against newly-received device profiles 130 of the client devices when the newly-received device profiles 130 are obtained from individual ones of the client devices 106. Further, in some examples, the computing environment 103 can generate the query to determine a number of the client devices 106 enrolled with the management service 115 that will be impacted by the conditions 166 or, more specifically, the automation 160 that includes the conditions 166.

In some examples, the computing environment 103 can generate the query such that it is executed on a database of device profiles 130, such as those stored in the data store 112 as historic device data 150. The query can be generated based on the conditions 166 specified in the user interface 175 in some examples. For instance, if an administrator desires to only interact with client devices 106 manufactured by AlphaCo ("Manufacturer includes AlphaCo," an example of a structured query language (SQL) query can include:

---
SELECT COUNT(*) FROM device_profile_table WHERE
     manufacturer='alphaco',
--- which would return a number of client devices 106 enrolled with the management service 115 manufactured by AlphaCo. As such, in step 624, the computing environment 103 can determine individual ones of the client devices 106 enrolled with the management service 115 that will be subject to or affected by the automation 160.

In step 627, the computing environment 103 can display information associated with the client devices 106 that will be affected or subject to the automation 160 in the user interface 175. For instance, the user interface 175 can include a summary region 225 having one or more operational metrics 153 shown therein. In one example, the operational metrics 153 can be generated based on the IF statement created through configuration of the condition cards 215 and/or the THEN statement created through configuration of the action cards 221.

In some examples, an operational metric 153 can include a number of client devices 106 enrolled with the management service 115 that would be affected by the automation 160. Further, in some examples, this operational metric 153 can be shown relative to another operation metrical 153, such as a total number of client devices 106 enrolled with the management service 115.

In additional examples, the summary region 225 can further include the automation run history 255 if the automation 160 has been previously made active. The automation run history 255 can this include a number of the client devices 106 that the automation 160 has been matched against that satisfy the criteria of the automation 160.

In other examples, the individual ones of the affected client devices 106 can be shown relative to another operational metric 153, such as a number of client devices 106 in a particular user group. Additionally, in some examples, one or more of the operational metrics 153 shown in the user interface 175 can be updated dynamically and in real-time. In other words, while a user customizes the WHEN statement, the IF statement, or the THEN statement in the user interface 175, the number of affected client devices 106 shown can be updated based on the customization. In some examples, when a change to a field or a value in the user interface 175 is detected, the management service 115 can generate and execute a query, as discussed in step 621.

In addition to the foregoing, in step 628, the computing environment can generate and display a forecast of an estimated time to complete the automation 160. As can be appreciated, when creating an automation 160 that affects a large number of the client devices 106 and, as such, can include a lot of actions 171 to perform, it can be beneficial to show a time estimate for the automation 160 to run for all of the client devices 106. For example, if 10,000 client devices 106 are to be affected by an automation 160, the management service 115 can estimate is that it will take 1.5 hours to complete and display this estimate in the user interface 175.

Assume, for example, an administrator creates an automation 160 to identify Windows 10 client devices 106 that do not have a critical patch installed, where the critical vulnerability score of this missing patch is relatively high. In this example, the administrator console 121 can show that 10,000 (or other amount) Windows 10 machines are missing the patch and, by saving and running the automation 160, the patch can be installed on all of these client device 106 within 24 hours. The prediction is thus valuable when estimating the time it will take to complete the automations 160 for all 10,000 devices.

Thereafter, in step 630, shown in FIG. 6B, the computing environment 103 can generate an automation 160 based on the triggers 169, conditions 166, and actions 171 defined in the administrator console 121. As can be appreciated, when the automation 160 is generated, the automation 160 can be stored in the data store 112 and made active or stored for use at a later time.

In step 633, the computing environment 103 can determine whether the automation 160 has been made active by the administrator or other user. For instance, the administrator can make an automation 160 active, which causes the management service 115 to execute the automation 160 or, in other words, begin matching the conditions 166 against device profiles 130 at a time specified in the trigger 169. If the automation 160 has not been made active, the process can revert until the administrator makes the automation 160 active. Thereafter, the process can proceed to step 636.

In step 636, the computing environment 103 can analyze device profiles 130 at a time specified by the trigger 169 to see if conditions 166 specified in the automation 160 are matched. For instance, if a condition 166 specifies "Platform includes iOS," the computing environment 103 can analyze the "platform_type" parameter of the device profile 130 to see if it includes "iOS."

Next, in step 639, the computing environment 103 can determine whether each condition 166 in the automation 160 has been matched. If not, the process can proceed to step 641 where the computing environment 103 can identify another device profile 130 to analyze with respect to the automation 160 until each device profile 130 identified in a query has been analyzed. Alternatively, if the computing environment 103 determines that each condition 166 in the automation 160 has been matched for a device profile 130, the process can proceed to step 644.

In step 644, the computing environment 103 can perform one or more actions 171 specified by the administrator when creating the automation 160. For instance, when a client device 106 enrolled with the management service 115 checks-in with the management service 115 by sending an updated device profile 130, the management service 115 can check the device profile 130 against any active automations 160. If the device profile 130 satisfies the conditions 166 in the automation 160, the management service 115 can cause one or more actions 171 defined in the automation 160 to be performed.

Next, in step 647, the computing environment 103 can display information associated with the client devices 106 subject to or affected by the automation 160. For example, as shown in FIG. 5, an automation run history 255 can be shown in the administrator console 121, where the automation run history 255 can illustrate a number of the client devices 106 that the automation 160 has been matched against that satisfy the criteria of the automation 160. By selecting or otherwise manipulating user interface component, a dialog 235 can be shown that lists the individual ones of the client devices 106 subject to the 1,300 runs. Thereafter, the process can proceed to completion.

The client devices 106 or devices included in the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 136, the agent application 133, the management service 115, the administrator console 121, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 180 upon which a user interface 175 generated by the client application 136 or another application can be rendered. In some examples, the user interface 175 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application 136, the agent application 133, and other various systems described herein can be embodied in software or code executed by general-purpose hardware as discussed above, as an alternative, the same can also be embodied in dedicated hardware or a combination of software/general-purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code stored and accessible from memory that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program instructions, program code, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described examples and embodiments without departing substantially from the spirit and principles of the disclosure. All such modifications and variations are intended to be included herein within the scope of this disclosure.

Therefore, the following is claimed:

1. A system, comprising:
    at least one computing device comprising at least one hardware processor; and
    program instructions stored in memory and executable in the at least one computing device that, when executed, direct the at least one computing device to:
        enroll a plurality of client devices with a management service;
        cause at least one user interface to be shown in a display of an administrator device of the management service, wherein the at least one user interface comprises at least one field for defining an automation to be deployed through specification of:
            a condition associated with the client devices enrolled with the management service;
            a trigger that directs the at least one computing device to match the condition against and at least one of a plurality of periodically-updated device profiles and a plurality of newly-received device profiles of the client devices; and
            an action to be performed automatically when the condition is satisfied;
        prior to generating the automation to be deployed, determine a subset of the client devices to be affected by the condition;
        in the at least one user interface, display a number of the client devices in the subset to be affected by the condition prior to generating the automation to be deployed;
        in response to a manipulation of the at least one user interface, display information associated with individual ones of the client devices in the subset to be affected by the condition in the at least one user interface prior to generating the automation to be deployed, wherein the information comprises at least one of: a platform, a user group, an operating system version, an enrollment status, and a device identifier of a respective one of the client devices; and
        generate the automation such that, in response to one of the newly-received device profiles being received from the respective one of the client devices that satisfies the condition, the action is performed automatically by the at least one computing device.

2. The system of claim 1, wherein the at least one computing device is further directed to:
    receive a submission of the condition, the trigger, and the action;
    in response to the submission, perform a matching of the condition against at least one of: the periodically-updated devices profiles and the newly-received device profiles; and
    display, in the at least one user interface, information associated with the matching of the condition.

3. The system of claim 2, wherein the information associated with the matching of the condition displayed in the at least one user interface comprises information associated with individual ones of the client devices in the matching.

4. The system of claim 1, wherein:
    the at least one field is a plurality of fields; and
    the condition, the trigger, and the action are generated based at least in part on (i) values specified in a first subset of the fields corresponding to a WHEN statement, the WHEN statement defining the trigger; (ii) values specified in a second subset of the fields corresponding to an IF statement, the IF statement defining the condition; and (ii) values specified in a third subset of the fields corresponding to a THEN statement, the THEN statement defining the action.

5. The system of claim 4, wherein the values specified in the second subset of the fields corresponding to the THEN statement direct a third-party service to perform a predetermined action.

6. The system of claim 1, wherein the trigger as defined directs the at least one computing device to match the condition against the newly-received device profiles of the client devices in response to receipt of individual ones of the newly-received device profiles from individual ones of the client devices in the subset.

7. The system of claim 1, wherein the client devices affected by the condition in the subset are determined by generating a query executed on a database of the periodically-updated device profiles, individual ones of the periodically-updated device profiles corresponding to a respective one of the client devices enrolled with the management service.

8. The system of claim 1, where the at least one computing device is further directed to:
    determine a number of the client devices in the subset to be affected by the condition;
    in the user interface, display the number of the client devices in the subset; and
    in response to a manipulation of a user interface component in the user interface, display the information associated with individual ones of the client device in the subset affected by the condition.

9. A non-transitory computer-readable medium embodying program instructions executable in at least one computing device that, when executed by the at least one computing device, direct the at least one computing device to:
    enroll a plurality of client devices with a management service;
    cause at least one user interface to be shown in a display of an administrator device of the management service, wherein the at least one user interface comprises at least one field for defining an automation to be deployed through specification of:
        a condition associated with the client devices enrolled with the management service;
        a trigger that directs the at least one computing device to match the condition against at least one of a plurality of periodically-updated device profiles and a plurality of newly-received device profiles of the client devices; and an action to be performed automatically when the condition is satisfied;

prior to generating the automation to be deployed, determine a subset of the client devices to be affected by the condition;

in the at least one user interface, display a number of the client devices in the subset to be affected by the condition prior to generating the automation to be deployed;

in response to a manipulation of the at least one user interface, display information associated with individual ones of the client devices in the subset to be affected by the condition in the at least one user interface prior to generating the automation to be deployed, wherein the information comprises at least one of: a platform, a user group, an operating system version, an enrollment status, and a device identifier of a respective one of the client devices; and generate the automation such that, in response to one of the newly-received device profiles being received from the respective one of the client devices that satisfies the condition, the action is performed automatically by the at least one computing device.

10. The non-transitory computer-readable medium of claim 9, wherein the at least one computing device is further directed to:

receive a submission of the condition, the trigger, and the action;

in response to the submission, perform a matching of the condition against at least one of: the periodically-updated devices profiles and the newly-received device profiles; and display, in the at least one user interface, information associated with the matching of the condition.

11. The non-transitory computer-readable medium of claim 10, wherein the information associated with the matching of the condition displayed in the at least one user interface comprises information associated with individual ones of the client devices in the matching.

12. The non-transitory computer-readable medium of claim 9, wherein the trigger as defined directs the at least one computing device to match the condition against the newly-received device profiles of the client devices in response to receipt of individual ones of the newly-received device profiles from individual ones of the client devices in the subset.

13. The non-transitory computer-readable medium of claim 9, wherein the client devices affected by the condition in the subset are determined by generating a query executed on a database of periodically-updated device profiles, individual ones of the periodically-updated device profiles corresponding to a respective one of the client devices enrolled with the management service.

14. The non-transitory computer-readable medium of claim 9, where the at least one computing device is further directed to:

determine a number of the client devices in the subset to be affected by the condition;

in the user interface, display the number of the client devices in the subset; and in response to a manipulation of a user interface component in the user interface, display the information associated with individual ones of the client device in the subset affected by the condition.

15. The non-transitory computer-readable medium of claim 9, wherein:

the at least one field is a plurality of fields; and the condition, the trigger, and the action are generated based at least in part on (i) values specified in a first subset of the fields corresponding to a WHEN statement, the WHEN statement defining the trigger; (ii) values specified in a second subset of the fields corresponding to an IF statement, the IF statement defining the condition; and (ii) values specified in a third subset of the fields corresponding to a THEN statement, the THEN statement defining the action.

16. The non-transitory computer-readable medium of claim 9, wherein the values specified in the second subset of the fields corresponding to the THEN statement direct a third-party service to perform a predetermined action.

17. A computer-implemented method, comprising:

enrolling a plurality of client devices with a management service;

causing at least one user interface to be shown in a display of an administrator device of the management service, wherein the at least one user interface comprises at least one field for defining an automation to be deployed through specification of:

a condition associated with the client devices enrolled with the management service;

a trigger that directs the at least one computing device to match the condition against at least one of a plurality of periodically-updated device profiles and a plurality of newly-received device profiles of the client devices; and an action to be performed automatically when the condition is satisfied;

prior to generating the automation to be deployed, determining a subset of the client devices to be affected by the condition; and in the at least one user interface, displaying a number of the client devices in the subset to be affected by the condition prior to generating the automation to be deployed;

in response to a manipulation of the at least one user interface, display information associated with individual ones of the client devices in the subset to be affected by the condition in the at least one user interface prior to generating the automation to be deployed, wherein the information comprises at least one of: a platform, a user group, an operating system version, an enrollment status, and a device identifier of a respective one of the client devices; and generate the automation such that, in response to one of the newly-received device profiles being received from the respective one of the client devices that satisfies the condition, the action is performed automatically by the at least one computing device.

18. The computer-implemented method of claim 17, wherein the trigger as defined directs the at least one computing device to match the condition against the newly-received device profiles of the client devices in response to receipt of individual ones of the newly-received device profiles from individual ones of the client devices in the subset.

19. The computer-implemented method of claim 17, wherein the at least one computing device is further directed to:

receive a submission of the condition, the trigger, and the action;

in response to the submission, perform a matching of the condition against at least one of: the periodically-updated devices profiles and the newly-received device profiles; and display, in the at least one user interface, information associated with the matching of the condition, wherein the information associated with the matching of the condition displayed in the at least one user interface comprises information associated with individual ones of the client devices in the matching.

20. The computer-implemented method of claim 17, wherein:

the at least one field is a plurality of fields; and the condition, the trigger, and the action are generated based at least in part on (i) values specified in a first subset of the fields corresponding to a WHEN statement, the WHEN statement defining the trigger; (ii) values specified in a second subset of the fields corresponding to an IF statement, the IF statement defining the condition; and (ii) values specified in a third subset of the fields corresponding to a THEN statement, the THEN statement defining the action.

\* \* \* \* \*